UNITED STATES PATENT OFFICE.

OLIVER G. HOLT, OF LOUISVILLE, KENTUCKY, ASSIGNOR TO MAX RIEBENACK, TRUSTEE.

INK.

SPECIFICATION forming part of Letters Patent No. 412,184, dated October 1, 1889.

Application filed June 15, 1889. Serial No. 314,326. (No specimens.)

*To all whom it may concern:*

Be it known that I, OLIVER G. HOLT, of Louisville, in the county of Jefferson and State of Kentucky, have invented a new and Improved Ink, of which the following is a specification.

This improved ink is adapted for use in type-printing, plate-printing, and lithographing as distinguished from a writing-fluid. The improved ink contains as its essential and characteristic constituent natural semi-fluid bitumen or maltha.

Natural semi-fluid bitumen or maltha as it occurs in nature is of a consistence and of a nature which renders it applicable as an ink for printing, engraving, or lithographing with very little manipulation. This semi-fluid bitumen or maltha occurs in nature in varying degrees of fluidity; but large quantities of it are to be found of exactly the proper consistence and degree of fluidity to enable it to be used as an ink without any special treatment. When this semi-fluid bitumen or maltha is found of the proper consistency, it makes in itself an ink possessing all the desirable qualities of the best printing and lithographing inks now in use, and possesses, in addition, qualities which are not found in ordinary printing-inks. When used directly as an ink without manipulation, it is found that while the material in bulk is of a color nearly black, when applied to paper by type or lithographic stone it presents a rich dark golden color, which is suitable for ornamental printing. The ink as thus used in its natural condition possesses greater elasticity and toughness than ordinary commercial inks, and moreover it is indelible. It unites with the paper in such a degree that none of the ordinary solvents, or any solvent as far as is now known, will remove the impression entirely. The ink has great brilliancy of tint, and as to its drying qualities it is equal or superior to the best commercial printing-inks. This natural semi-fluid bitumen is of uniform consistence throughout, and occurs in nature in an almost absolutely pure condition, there being practically no foreign substances mingled with it. This homogeneous character of the semi-fluid bitumen insures great delicacy of impression when it is used as an ink, so that it can produce the finest and most delicate lines, such as are employed in the finest engraved work. The ink made of this semi-fluid bitumen distributes smoothly and evenly over the impression-surface, and its toughness and elasticity are a perfect guarantee against blurring and running, which are so common with ordinary commercial inks. This natural semi-fluid bitumen or maltha can be used as an ink-body in order to produce other colors in printing than its own natural color by combining with it suitable pigments. Combined with a small percentage of lamp-black it produces a perfect black ink suitable for general press-work. and an almost infinite variety of tints and shades can be produced by the addition of the proper pigments, the colors produced being of a delicacy and beauty which have hitherto been unsurpassed. The homogeneous character of the semi-fluid bitumen renders the admixture therewith of pigments readily and easily accomplished. A very little grinding of the semi-fluid bitumen after the addition thereto of the pigment will cause the pigment to be thoroughly and easily distributed throughout the mass.

In case the natural semi-fluid bitumen or maltha is too thick for immediate use as an ink, it can be thinned to the proper consistence either by the addition of an oil—such as linseed-oil—or by incorporating with it a semi-fluid bitumen of greater fluidity.

In case the natural semi-fluid bitumen or maltha is too thin or too fluid to be used immediately as an ink, it can be brought to the proper consistence either by boiling or heating the same, so as to drive off the more volatile constituents, or by adding thereto less fluid bitumen. Too fluid bitumen can also be thickened by the addition of powdered magnesia or resin or resinous gums.

In addition to the desirable qualities already enumerated which are possessed by an ink for printing and lithographing having as its essential and characteristic constituent bitumen in a semi-fluid condition, this ink can be produced at a cost greatly below that of the cheapest and most inferior of ordinary commercial inks. The cost of a black ink for ordinary press-work made in accordance with this invention, while in all respects equal to the very best ordinary commercial black inks, will not exceed twenty per cent. of the cost of the most inferior black inks now in use.

I make no claim to an ink composed of hard asphalts—such, for example, as grahamite. In order to make an ink out of such hard asphalts, it is necessary to first reduce them to a condition in which they can be worked either by grinding into a powder or by fusing, and then it is essential to add oil or other ingredients to them before an ink can be formed. The result of these necessary manipulations is to add to the cost, making the ink so prepared quite expensive. The semi-fluid maltha, on the contrary, requires little or no treatment to enable every character of printing to be done with it.

I claim as my invention—

1. An ink having as its essential and characteristic constituent semi-fluid maltha.

2. An ink composed of semi-fluid maltha and a pigment or pigments.

In witness whereof I have hereunto signed my name in the presence of two subscribing witnesses.

OLIVER G. HOLT.

Witnesses:
ARTHUR L. BROWNE,
CARLETON E. SNELL.